United States Patent [19]

Humphrey

[11] 4,130,361
[45] Dec. 19, 1978

[54] LENS METER WITHOUT RELATIVELY MOVING OPTICAL PARTS

[75] Inventor: William E. Humphrey, Orinda, Calif.

[73] Assignee: Humphrey Instruments, Inc., San Leandro, Calif.

[21] Appl. No.: 804,034

[22] Filed: Jun. 6, 1977

[51] Int. Cl.² .............................................. G01B 9/00
[52] U.S. Cl. ..................................... 356/125; 356/127
[58] Field of Search ................. 356/124, 125, 126, 127

[56] References Cited

U.S. PATENT DOCUMENTS

| 3,870,415 | 3/1975 | Cornsweet | 356/124 |
| 4,007,990 | 2/1977 | McDevitt et al. | 356/124 |

Primary Examiner—John K. Corbin
Assistant Examiner—R. A. Rosenberger
Attorney, Agent, or Firm—Townsend and Townsend

[57] ABSTRACT

A lens meter for analyzing suspect lenses in terms of sphere, cylinder and axis by optical beam deflection and without relatively moving optical parts is disclosed. A light source emanating a substantially collimated beam of light from an entrant aperture into a retroreflecting mechanism includes two important properties. The first property is that an image of the entrant aperture is displayed from and reimaged across the optical axis of the retroreflector to a conjugate location at a real image exit aperture, this aperture being provided with a coincident optical stop. Secondly, in the absence of a test lens in the light path, light entrant to the retroreflector through the entrant aperture along a first path departs the real image of the exist aperture along a second path with a known angularity to the first path. Assuming that a suspect lens containing components of sphere and cylinder is interposed to the entrant and exit aperture, this angular deviation changes across the lens sampling entrant-exit aperture base leg. Specifically, the changed angular deviation is a function of sphere and cylinder present in the suspect lens. By algebraic summing of the resultant angular deviations, the power of the suspect lens can be measured in sphere, cylinder and axis either by notation in sphere and cross-cylinder components or by more conventional sphere, cylinder and axis notation. Provision is easily made to detect prism.

23 Claims, 25 Drawing Figures

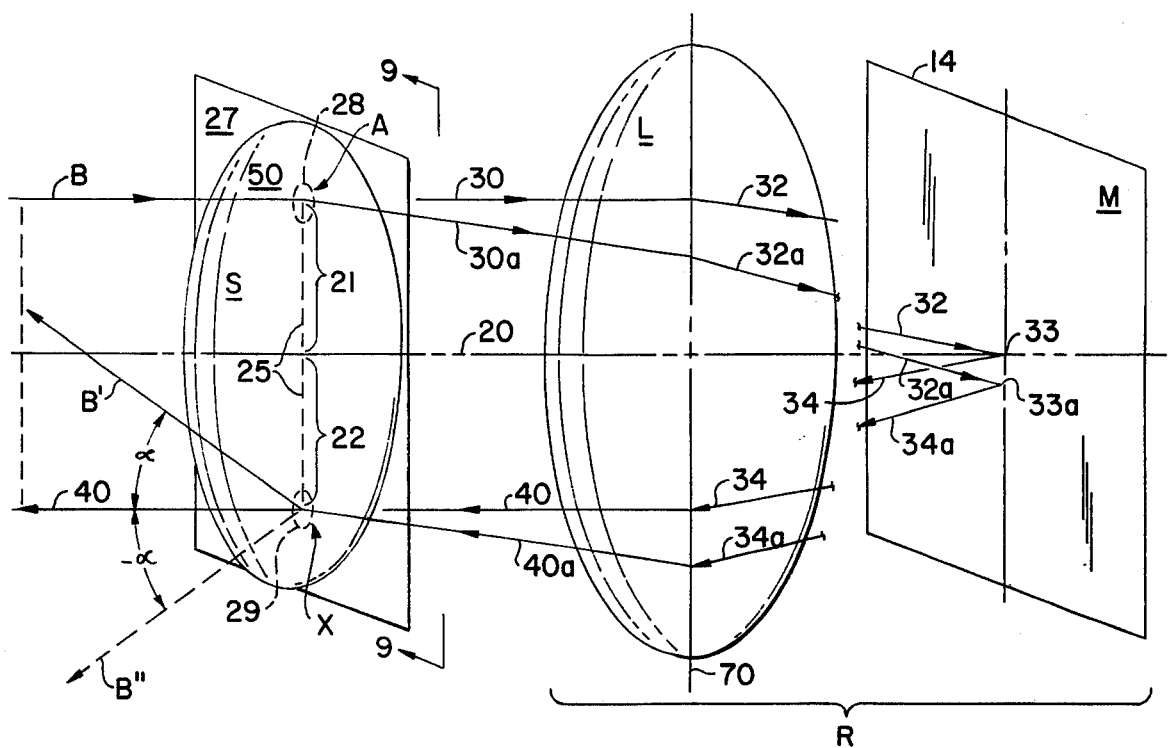
FIG._1.
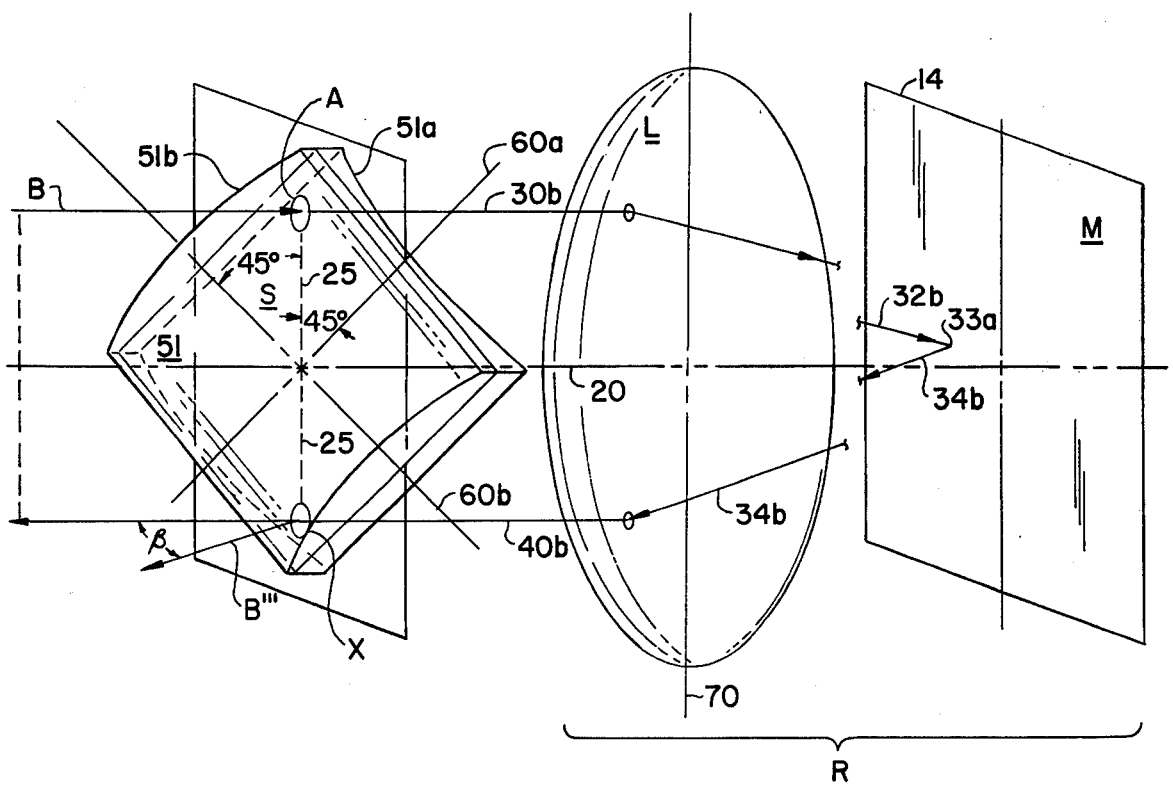
FIG._2.

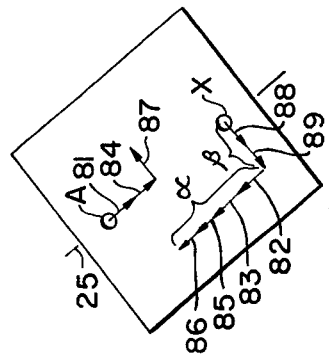
FIG._3d.
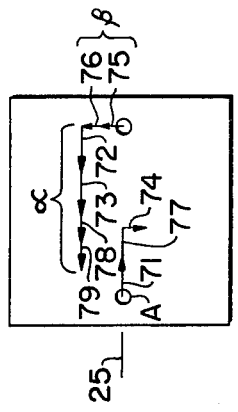
FIG._4d.
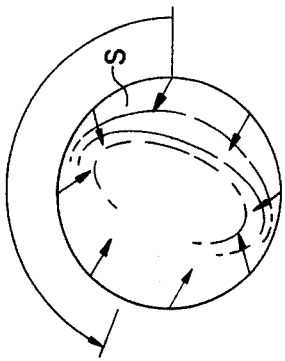
FIG._5d.
POSITIVE CONVENTION
0.3 SPHERE, 1.4 CYLINDER, 67.5°
NEGATIVE CONVENTION
1.7 SPHERE, -1.4 CYLINDER, 157.5°
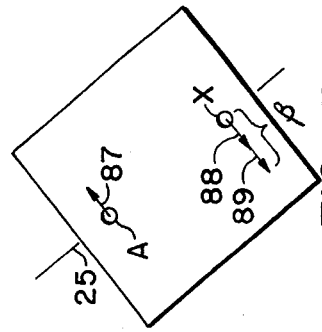
FIG._3c.
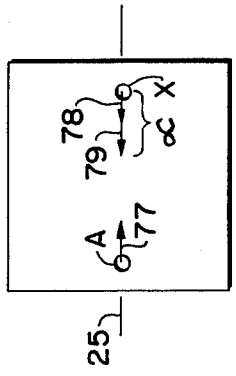
FIG._4c.
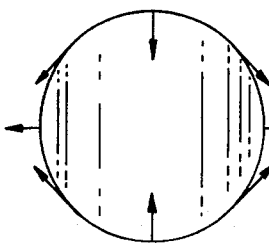
FIG._5c.
+0.5 DIOPTER AT 90°
-0.5 DIOPTER AT 0°
(CROSSED-CYLINDER)
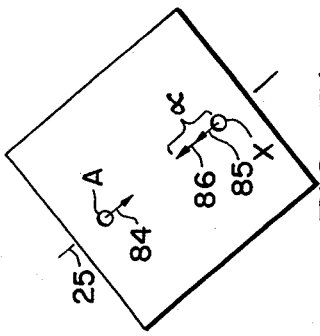
FIG._3b.
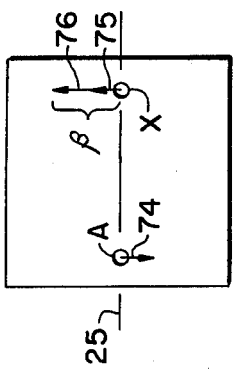
FIG._4b.
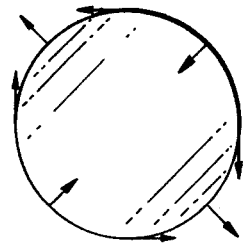
FIG._5b.
+0.5 DIOPTER AT 45°
-0.5 DIOPTER AT 135°
(CROSSED-CYLINDER)
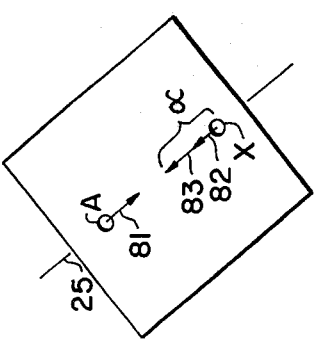
FIG._3a.
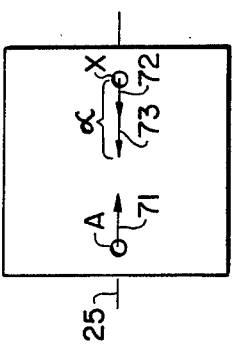
FIG._4a.
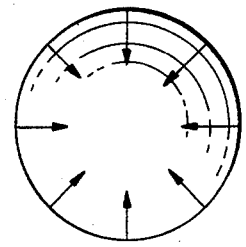
FIG._5a.
+1 DIOPTER
(SPHERE)

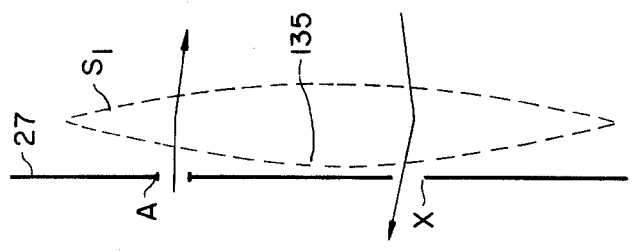
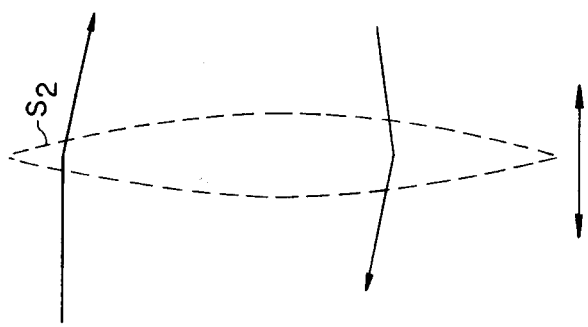
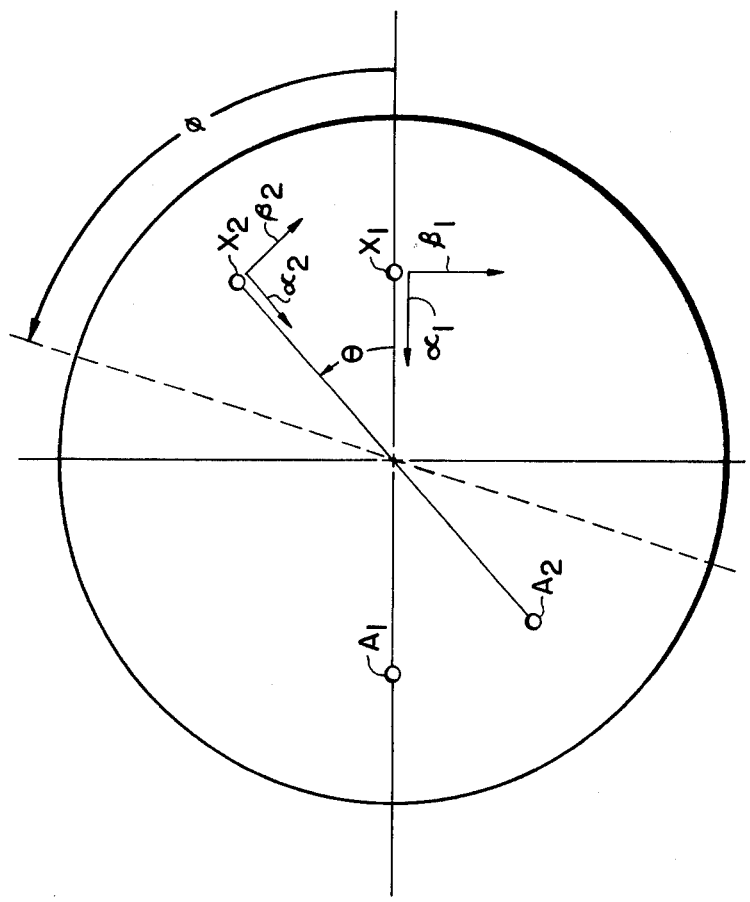
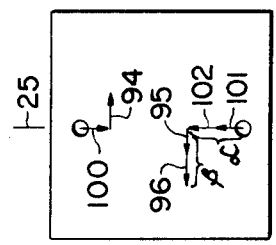
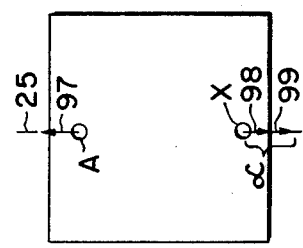
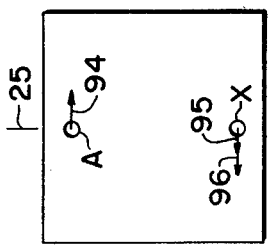
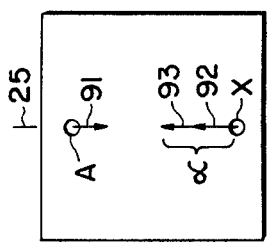

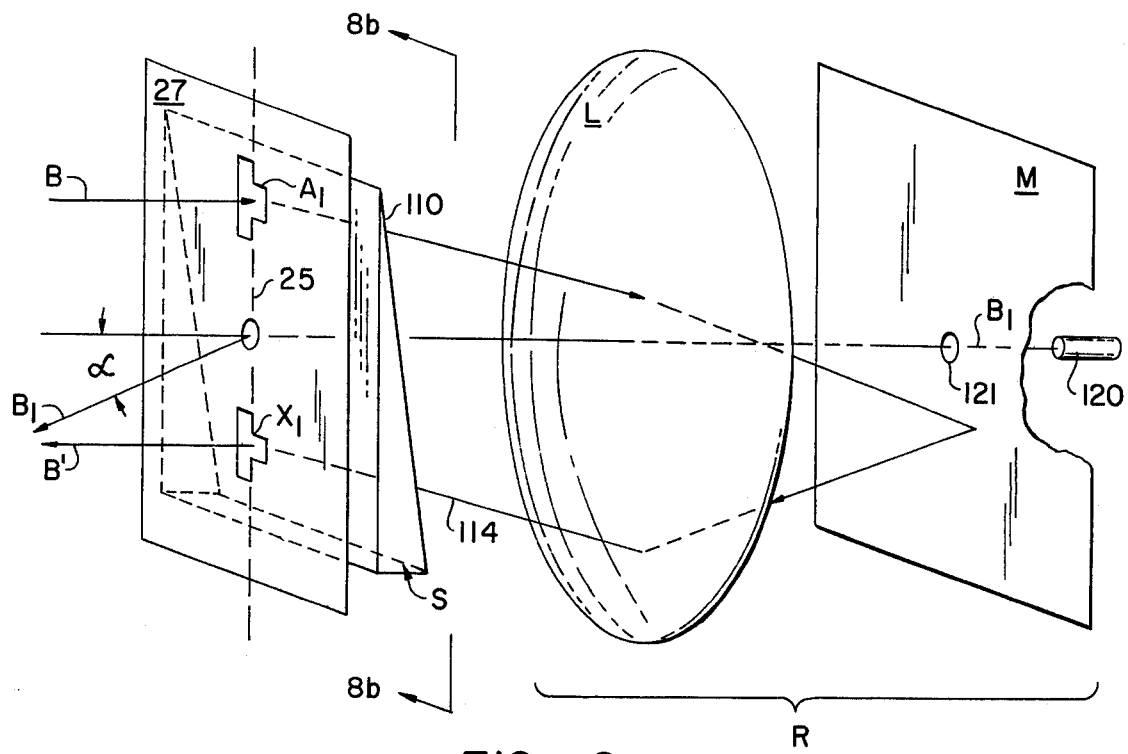
FIG._8a.
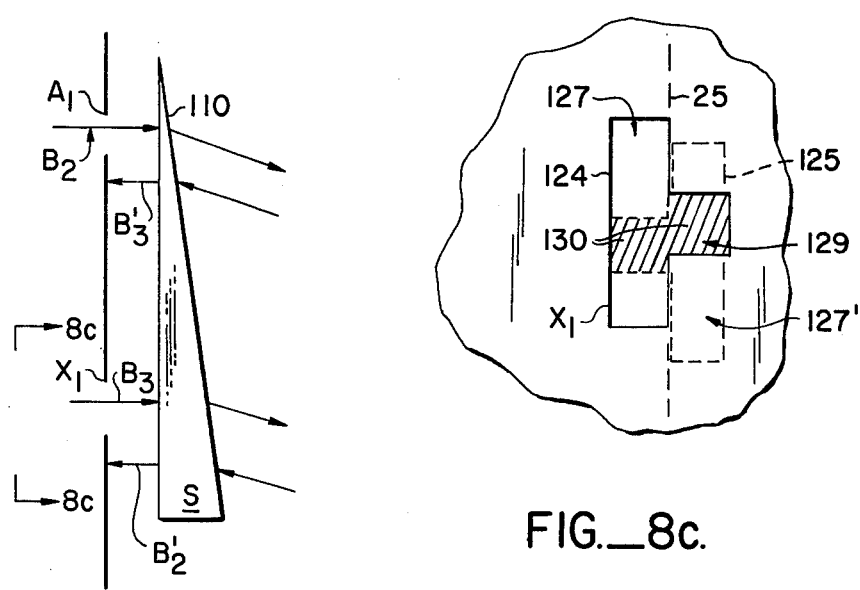
FIG._8b.
FIG._8c.

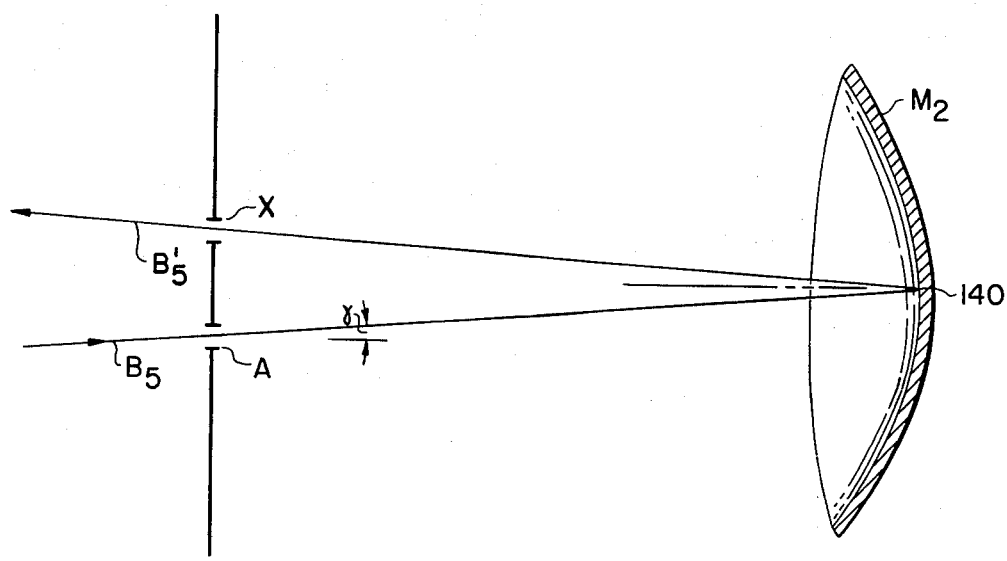
FIG._10.
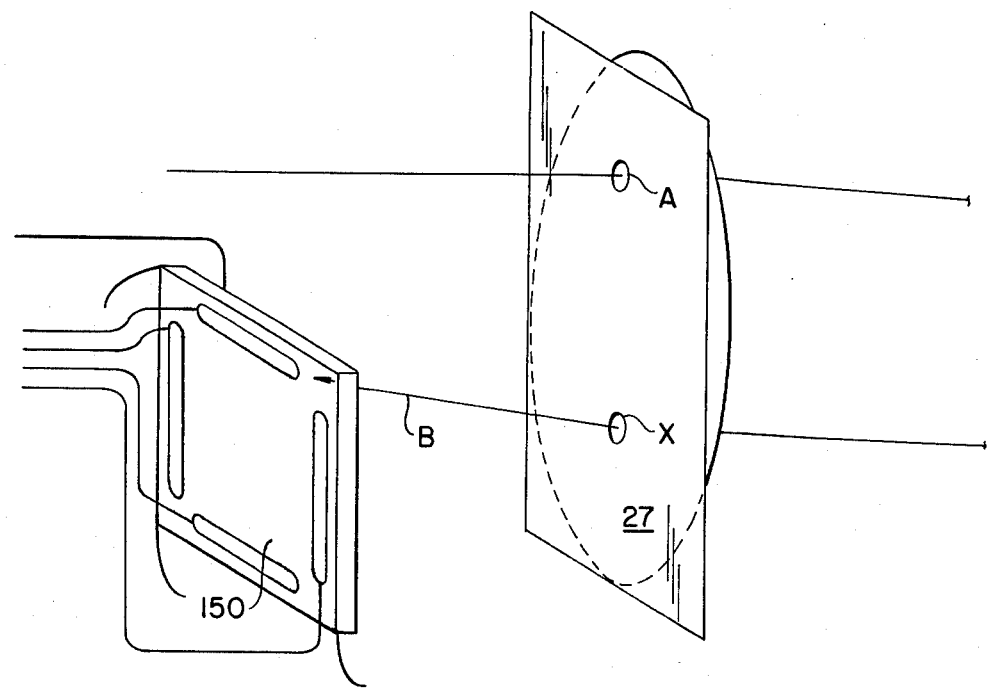
FIG._11.

LENS METER WITHOUT RELATIVELY MOVING OPTICAL PARTS

This invention relates to a lens meter. Specifically, a lens meter is disclosed which can measure sphere, cylinder, axis and prism components of a suspect lens, all of these measurements being obtained without relatively moving optical parts.

SUMMARY OF THE PRIOR ART

Conventional lens meters commonly employ what is known as a target mire. Typically, the suspect optical system is placed into the lens meter, preferably at the major reference point of the suspect optical system. The imaging of a target mire occurs through a very small area of the suspect optical system, again preferably at the major reference point. In measurement, the target mire is manually rotated to be aligned with either a maximum or a minimum of meridian power in the suspect optical system. Thus, it can be seen that rotational alignment of the lens meter to a suspect astigmatic axis of the suspect optical system occurs. Once the target mire is aligned and lines within the image focused to a maximum clarity (say, for example, to the maximum of meridian power), a first recordation is made. Thereafter, a standard lens is moved to a second position to produce maximum clarity on a second and different set of lines in the target mire image (for example, to the minimum of meridian power). A second recordation is made. By the expedient of noting one reading as sphere, noting the difference between the readings as cylinder, and noting the alignment of the target mire at maximum or minimum as axis, a conventional measurement of the power of a suspect system in power of sphere, power of cylinder, and alignment of cylinder can be made.

This conventional prior art system is not without its disadvantages. First, it requires rotation of an element in the lens meter into coincidence with a principal axis of a suspect optical system. Secondly, such lens meters are not conveniently adapted to provisions for automation; a device which automatically determines the prescription provided in a pair of glasses cannot be easily designed around their operation. Third, when the target mire is rotated to focus at maximum meridian power, portions of the target mire image used at minimum meridian power are obscured. Conversely, when the target mire for minimum meridian power is in focus, the portion of the target mire image used at maximum meridian power is obscured. Additionally, such conventional lens meters only look through a small segment of a lens. Uniformity of the entire lens is commonly not analyzed without numerous repetitions of the original process. Where lenses are moved to sample other points on their surface, the entire measurement procedure must be repeated, usually with separate compensating prisms to overcome the variations in prism over the surface.

It should be additionally noted that such prior art lens meters can be in error by a factor which is directly proportional to any error in the eye of an operator utilizing the lens meter. It has been discovered that astigmatic errors can vectorially add. Thus, where an examiner with an astigmatic error looks through a conventional lens meter, his reading of the suspect optics can be off by a factor related to the eye examiner's personal astigmatism. Similarly, a spherical refractive error will effect the readings. While such an error will decrease with the increasing power of a telescope commonly affixed to and associated with such lens meters, it should be understood that such an error can and often is introduced into the analysis of a syspect optical system by a conventional lens meter.

"A Process and Apparatus For the Astigmatic and Spherical Subjective Testing of the Eye", U.S. Pat. No. 3,947,097 issued Mar. 30, 1976, has been developed by me. Regarding the testing of lenses, this prior art patent is complicated by two factors. First, the eye in viewing a distant object spherically accommodates or "hunts." This "hunting" of the eye for an image at the retinal plane renders the process therein disclosed generally not satisfactory for lens measurements.

Secondly, the aforementioned process and apparatus requires either relatively moving cross cylinders or specifically designed lenses, especially for the astigmatic measurements. Specifically, relatively moving special lenses such as those shown in my "Variable Astigmatic Lens and Method For Constructing Lens", U.S. Pat. No. 3,751,138 issued Aug. 7, 1973, are used. It should be noted that when these lenses are used, translation of the elements must occur for the disclosed process.

Additionally, it has been shown that by utilizing cross cylinders, astigmatism can be described in elements of cross cylinder with the cross cylinders being preferably aligned 45° to each other. Once this description of lens effect is employed, it can be shown that the resultant components of astigmatism can vectorially add. Heretofore, however, all such processes either use relatively moving cross cylinders for the measurement or special lens elements such as those previously described. While astigmatic measurement can occur which is independent of sphere, instruments incorporating these relatively moving special optics are complex.

SUMMARY OF THE INVENTION

A lens meter for analyzing suspect lens in terms of sphere, cylinder and axis by optical beam deflection and without relatively moving optical parts is disclosed. The meter includes a light source emanating a substantially collimated beam of light from an entrant aperture into a retroreflecting mechanism. This retroreflecting mechanism includes two important properties. The first property is that the image of an entrant aperture is displaced from and reimaged across the optical axis of the retroreflector to a conjugate location at a real image exit aperture, this real image exit aperture preferably being provided with a coincident optical stop. Secondly, in the absence of a test lens in the light path, light entrant to the retroreflector through the entrant aperture along a first path departs the real image of the exit aperture along a second path with a known angularity to the first path. Assuming that a suspect lens containing components of sphere and cylinder is interposed to the entrant and exit aperture, this angular deviation changes across the lens sampling entrant-exit aperture base leg. Specifically, the changed angular deviation is a function of the power of sphere and cylinder present in the suspect lens. Angular displacement of a light beam normal to a plane including the optical axis of the retroreflector and a line between the entrant and exit aperture base leg is proportional to the cross cylinder power of the suspect lens system diagonal to the entrant exit aperture base leg axis. Angular displacement along the entrant-exit aperture axis is proportional to a meridian optical power measurement which is serendipitously useful. This meridian optical power measurement is a combination of both the existent sphere of the suspect lens and the optical cross cylinder in the plane of and normal to the entrant-exit aperture base leg axis. A second measurement employing a second lens sampling entrant-exit aperture base leg and second measured angular displacement of a second light beam either normal to a second reference plane or parallel to the second reference plane, or both, may be carried out. When measured a second time at a different angular alignment (preferably at an angle of 90° to the original measurement), complete measurement of the suspect lens results. Specifically by algebraic summing of the resultant angular deviations, the power of the suspect lens can be measured in sphere, cylinder and axis either by notation in sphere and cross-cylinder components or by more conventional sphere, cylinder and axis notation. Provision is easily made to detect prism.

OTHER OBJECTS AND ADVANTAGES OF THE INVENTION

An object of this invention is to disclose an appratus and process for the measurement of optical cross cylinder. According to this aspect, the light source for emanating a beam of substantially collimated light through an entrant aperture into a retroreflective mechanism includes two important properties. First, the entrant aperture is displaced from and reimaged across the optical axis of the retroreflector to a conjugate location. Secondly, in the absence of the test lens in the light path, light entrant to the retroreflector through the entrant aperture has a known angularity to light emanating from the image of the exit aperture. By the placement of a suspect lens containing components of sphere and cylinder across the sampling base leg between the entrant and exit aperture, the exit aperture angularity of the beam normal to a plane including the axis of the retroreflector and the entrant exit aperture axis is a function of cross cylinder diagonal to the entrant-exit aperture axis.

An advantage of the observed angularity normal to the plane is that it is a function of diagonal cross cylinder only. Sphere is completely screened out. Likewise, cross cylinder along or normal to the entrant-exit aperture axis is screened out.

A further advantage of this disclosed lens meter is that there is no need for specialized optics. Rotating cross cylinders or special lenses need not be placed in the lens train. Moreover, no relatively moving optical parts are required.

Yet another advantage is that there is no requirement to align any principal axis to the suspect optics. Measurement without any relative rotation to a suspected axis occurs.

Yet another advantage of this invention is that the exit beam of light can be projected a specified distance to a screen from the exit aperture. The resultant displacement of the beam of light on the screen normal to the plane including the axis of retroreflector and the axis of the entrant-exit apertures can be conveniently measured. This displacement is a direct measurement of diagonal cross cylinder.

Yet a further advantage of this invention is that angular deflections of the beam along the entrant exit aperture axis contains a meridian lens power which is both a combination of sphere and cross cylinder power aligned to and normal to the entrant-exit aperture axis. This meridian power contains an algebraic sum of sphere and cross cylinder in or normal to the entrant-exit aperture axis which cannot be broken out or separated in one measurement; however, this sphere power can be broken out by a subsequent measurement and a disclosed algebraic summation. Thus, this subsequent measurement about a second entrant-exit aperture axis has serendipitous utility.

A further object of this invention is to disclose an apparatus and process for measurement of sphere, and diagonally aligned cross cylinder and/or more conventional sphere, cylinder and axis. According to this aspect of the invention, a second meridian measurement is taken at an angle relative to the first meridian measurement. Preferably this is accomplished by measuring the displacement of a second beam of light. This second beam of light containing all the parameters of the first disclosed beam of light is taken through a different plane, which plane is rotated about the axis of the retroreflector. By utilizing a disclosed algebraic relationship, complete measurement of the suspect lens system in sphere, cylinder and axis can occur.

An advantage of the disclosed system is that alignment of the first and second entrant-exit apertures to a 45° angle gives a simple result. First the two astigmatic components of 45° aligned cross cylinder are separately generated. Second, by a disclosed summation process, sphere is easily determined from the two measurements.

Yet another advantage of the invention is to align the entrant-exit apertures of the first and second measurements at 90° to each other. This alignment of the entrant-exit apertures at 90° produces maximum accuracy within the confines of a given circular area of lens surface. In the disclosed system, a component of astigmatism and sphere can be read by a disclosed process of algebraic summation.

Yet a further advantage of this invention is that when measurement of sphere, cylinder and axis of a suspect lens is determined by a second orientation of the disclosed entrant-exit aperture base leg, an ambiguity of measurement results. Four separate and meaningful algebraic relations are obtained for the solution of three unknowns. The excess of measurement information provides an error check against inconsistency in the measurements.

An advantage of the disclosed system is that there is no need to rotate mechanisms into alignment with the suspect lens. Rather, the mere placement of the suspect lens in the disclosed instrument produces the full prescription of the lens.

Yet another advantage of the disclosed measurement process is that an operator is completely taken out of the measurement process. No requirement for a skilled, specially trained operator is present for the measurement of lens power. Moreover, the human error common in recording and combining separate readings taken from prior art lens meters is eliminated. Moreover, the tendency for astigmatism or sphere error present in the eye of such an operator to add an modify the observed measurement to produce error is eliminated. The entire lens measurement procedure is completely automated.

Sill another advantage of the measurement process is that uniformity of the suspect lens can be easily tested by translating the suspect lens. Since the disclosed test is not sensitive to prism, translation yields substantially the same angularity where a lens is uniform in sphere, cylinder and axis.

A further object of the invention is to disclose a device for measuring sphere and cross cylinder which is insensitive to introduced prism. According to this aspect of the invention, the retroreflecting mechanism of this invention, upon the retroreflection of impinging light, causes prism in a lens to be cancelled in the exit light angularity.

An advantage of this aspect of the invention is that suspect optics do not have to be registered to their central axis. Rather, measurement of introduced sphere and cylinder can be determined independently of the principal axis.

A further object of this invention is to adapt the lens meter of this invention to detect prism. According to this aspect of the invention, the retroreflecting mechanism is provided with an aperture along its central axis. A ray of light is introduced through the central axis of the retroreflector to impinge on and through the suspect optics. By measuring the angularity resultant from the suspect optics, the presence of prism can easily be detected.

A further object of this invention is to disclose the capability of this lens meter in measuring both the vertex measurements and lens power measurements. When the vertex measurement is made (distance between the back plane of eye optics and the focal plane of eyeglasses), the lenses are juxtaposed to the aperture mask between the retroreflecting mechanism and the aperture mask. When lens power is measured, the suspect optics are placed on that side of the mask away from the retroreflecting optics.

An advantage of this aspect is that the disclosed lens meter is particularly suitable for measurements of suspected prescriptions in eyeglasses.

A further object of this invention is to disclose alternate retroreflector embodiments. While it has been found that many optics have the property of retroreflecting an aperture to a conjugate location and introducing known angularity, two preferable retroreflectors are herein disclosed.

A first preferable retroreflector includes a conventional spherical lens having its focal plane coincident with the reflecting mirror. In this retroreflector, light enters and exits apertures at the lens in parallel angularity.

In an alternate embodiment the apertures (or stop creating the apertures) are registered to the conjugate positions of a spherical reflector. Preferably, the spherical reflector is a front surface reflector (although rear surface mirror reflectors can be used). In this case, the entrant and exit beams from the retroreflector are not parallel but are proportional in their angularity according to the law of reflection as modified by the spherical reflection surface.

An advantage of this latter embodiment is that no intervening optics are required between the suspect lens and retroreflecting mirror. Thus, introduction of secondary reflections at airglass interfaces is held at a minimum.

A further object of this invention is to disclose a method for automatically detecting the angularity of light exiting from the lens meter of ths invention.

According to a first embodiment of this invention, light is impinged on a photorsensitive matrix. By measuring the point of impingement, and knowing the distance between the optical stop of the apertures and screen, the angle is easily measured.

Other objects, features and advantages of this invention will become more apparent after referring to the following specification and attached drawings in which:

FIG. 1 is a perspective schematic of a lens meter apparatus according to this invention here shown measuring a suspect lens having only sphere therein;

FIG. 2 is a perspective schematic of the same lens meter apparatus here shown measuring diagonal cross cylinder only;

FIGS. 3a–3d are schematics showing how the paired cross cylinders and an equivalent sphere are added one to another to produce a composite prescription as shown schematically in FIG. 3d;

FIGS. 4a–4d are schematics showing a first entrant-exit aperture measurement illustrating vectorially the angular displacements caused by the suspect optics;

FIGS. 5a–5d are schematics showing second entrant-exit apertures aligned at a 45° relative angle to the optical axis of FIGS. 4a–4d with schematic vector deflection;

FIGS. 6a–6d are schematics showing third entrant-exist apertures aligned at 90° relative to the optical axis of FIGS. 4a–4d with schematic vector deflection;

FIG. 7 is a theoretical schematic illustrating the general case of entrant-exit aperture axis rotation to provide complete suspect lens analysis in sphere, cylinder and axis;

FIG. 8a is an embodiment of this invention illustrating specialized apertures in use, and setting forth the insensitivity of the sphere and cylinder measurement light rays to prism (the actual measurement of prism being separately shown);

FIG. 8b is a view taken along lines 8b—8b of FIG. 8a illustrating the effect of prism parallax;

FIG. 8c is a view taken along lines 8c—8c of FIG. 8b illustrating the function of the specialized aperture in minimizing the effect of prism parallax;

FIG. 9 is a view taken along lines 9—9 of FIG. 1 illustrating the various placements of a lens in the apparatus of FIG. 11 for the measurement of vertex and lens power;

FIG. 10 is an illustration of a spherical retroreflector; and

FIG. 11 is a view of apparatus adapted to be used in conjunction with the optics of FIG. 1 for measuring the angularity of departing light.

DETAILED DESCRIPTION OF THE DRAWINGS

Referring to FIG. 1, a linear beam of light B (for example, emanating from a laser or other light source of limited divergence) passes through an aperture A and into a retroreflecting mechanism R. Assuming that a suspect lens S is not in the optical path, it will be instructive to trace the path of the optical rays. To do this, first the geometric arrangements of the retroreflector R will be discussed. Thereafter, the path of an undeviated beam B through the retroreflecting mechanism will be set forth.

The retroreflector consists of a spherical lens L having a known focal length. Specifically, the lens L is positioned at its focal length from a reflecting element M. In this case the element M is a plane mirror 14 which is positioned precisely at the focal length of the lens L.

Beam B is incident to lens L through an entrant aperture A. Entrant aperture A is typically positioned again at the focal length of lens L from the lens L.

It will be noted that entrant aperture A is not located at the axis 20 of lens L; rather, it is displaced to the side of the axis 20 a distance 21 along an entrant-exit aperture axis 25. Entrant-exit aperture axis 25 passes through center line 20 of lens L, which center line 20 is also the center line of the retroreflecting mechanism R.

The image X of entrant aperture A is focused to a conjugate location relative to lens L. Specifically, it lies along entrant-exit aperture axis 25 at a distance 22 from the center line 20 of lens L. Distance 22 is precisely equal to distance 21. It can be said to be at a conjugate location to its object, entrant aperture A.

It is preferred that the entrant aperture A and the exit aperture X each be provided with an optical stop. However, the size of these stops may differ. Therefore, an optically opaque stop 27 with apertures 28 and 29 coincidentally registered to apertures A and X is utilized. As is well known to those skilled in the art, the optical stop provided by apertures 28 and 29 controls scattered light, and reduces the change in angular deflections for differing area elements of suspect optics.

Having set forth the geometry, the light path of a beam B without the presence of the suspect spherical optics S can now be set forth.

Specifically, incident light passes parallel and undeflected through aperture 28 along beam 30. It is deflected at spherical lens L to a deflected angularity at ray 32 where it becomes incident upon the center of the mirror S at a position 33. Following the law of reflection it is reflected at light ray 34 and is again optically deflected at a known angle relative to the optical axis 20 along an outgoing path 40.

It will be found that the retroreflecting system here provides two important properties. First, it always produces an image of the entrant aperture A at exit aperture X. Second, light passing through entrant aperture A departs exit aperture X at a known and proportional angle relative to the angle of light at entrant aperture A. In the case of the system here shown and in the absence of the suspect optics S, incident light beam B at entrant aperture A is parallel to the optic axis 20 of the retroreflector, and the exiting ray 40 will leave the instrument parallel to the optical axis 20.

Having set forth the embodiment of the test instrument without the presence of the suspect optics S, the case will be considered where the suspect optics S are placed in the system. Specifically, suspect optics S are placed in the system consisting of a positive spherical lens 50.

Assuming that suspect optics 50 are placed immediately in front of aperture A, a deflection of beam B at aperture A towards the center line 20 of the retroreflector R will occur. Light deflected by suspect optics A will follow the path 30a. At lens L light will again be reflected to a path 32a which impinges upon mirror M (here shown as plane mirror 14) at a new position 33a. The rebounding beam 34a will impinge on lens L at an outward location to 34 and be deflected to a path 40a.

It will then pass through the image of the entrant aperture at the exit aperture X. It will be seen that the angularity of the path 30a is parallel to the path 40a. However, when beam 40a passes through exit aperture X it is again deflected by the spherical lens. Such deflection of the positive spherical lens 50 causes additional deflection of outgoing beam B'. It will be noted that this deflection is in a plane including the optical axis 20 of the retroreflector and the entrant-exit aperture axis 25. In the case of the positive spherical lens here shown, this angular deflection is toward the optical axis 20 of the retroreflector, an angle $\alpha$.

Those skilled in the art will appreciate that a negative spherical lens being substituted for a positive spherical lens 50 would produce an opposite result. Specifically, and without tracing the path involved, exiting rays would be deflected along the path B''' if a negative spherical lens were utilized.

Having set forth the case and the deflections involved where a spherical suspect lens is used, the case of an optical cross cylinder lens can be discussed. Such a case is illustrated with reference to FIG. 2.

Suspect lens S in FIG. 2 is an optical cross cylinder. This cross cylinder can be understood by breaking the lens element into two discrete components.

First, the cross cylinder consists of a negative lens 51a (for example, negative half a diopter) of cylinder along an optical axis 60a. Axis 60a is at 45° clockwise rotation from entrant-exit aperture axis 25. Secondly, the lens includes a positive cylindrical lens 51b (for example, positive half a diopter) along an axis 60b. Axis 60b is at 45° counterclockwise rotation from entrant-exit aperture axis 25. It will readily be seen that the sum of the two cross cylinders of the lenses 51b and 51a is equivalent to one diopter of total cylinder effect.

As the lenses 51a and 51b are commonly formed from a singular piece of glass without an interface therebetween, they may be viewed as one lens. It will further be seen that the cylindrical powers of the cross cylinder are diagonal to the entrant-exit aperture 25.

Having described the properties of the new suspect lens S which collectively will be denominated 51, the deflection of light through the retroreflecting mechanism R with the suspect lens 51 in place can now be set forth.

Specifically, beam B is deflected by cross cylinder lens 51 along a path 30b. This deflection is a result of the positive cylinder 51b towards axis 60b and of the negative cylinder 51a away from axis 60a. Impingement of the beam B is thus shown moved off of the optical diameter 70 of lens L.

Light is reflected from lens L along a path 32b, which path 32b impinges upon mirror M (here plane mirror 14) and then proceeds as reflected beam 34b. Beam 34b passes outwardly along a path 40b to the exit aperture X where it is again refracted by the optical cross cylinder of the lens components 51b and 51a. Lens 51b causes deflection of the beam towards axis 60b. Lens 51a causes deflection away from the axis 60a.

Analysis of the resultant deflection is instructive. Specifically, and in the case of cross cylinders of equal and opposite power, it will be seen that optical deflections along the entrant-exit aperture axis 25 cancel one another. Thus, there is no net angular deflection of the exit beam B''' in the plane.

However, deflection normal to the plane of the axis of the retroreflector 20 and the entrant-exit aperture axis 25 does occur. Specifically, beam B''' is deflected at an angle normal to the plane of the optical axis 20 and the entrant-exit aperture axis 25 by an angle $\beta$.

It is at this point that a utility of the measurement procedure here shown results. Specifically, the angle of deflection normal to the plane is a precise measurement of cross cylinder only. Even assuming that some sphere or cross cylinder parallel or normal to the entrant-exit aperture axis 25 was introduced, it has been found that the deflection of the beam B''' normal to the plane include the retroreflector axis 20 and the entrant-exit aperture axis 25 is a measure of cross cylinder diagonal to the entrant-exit aperture axis 25. Thus, by measuring the deflection of B''' normal to the plane, cross cylinder only on the diagonal axis 60a, 60b is measured.

Thus is will be seen that with two apertures, the measurement of pure diagonal cross cylinder always occurs. This diagonal cross cylinder is diagonal to the entrant-exit aperture axis 25.

For the case here shown, it will also be noted that a ray upon exiting from the exit aperture X in both cases has its angle of deviation effectively doubled. It should be understood that in measuring the total angular deflection at the exit aperture X, that the deviation is not appreciably altered by translation of the lens element. For example, if the geometric center of the lens was moved to either the entrant aperture A or the exit aperture X, obviously deflection caused at this juncture would be practically non-existent. However, the deflection read at the remaining spaced aperture would be effectively doubled, resulting in essentially the same net deflection.

Understanding the case illustrated in FIG. 2, it should be understood that the lens meter of this invention can easily be used to locate the "principal axis" of a lens system having cylinder. By the expedient of rotating a suspect lens until all optical deflection occurs within the plane including the entrant-exit aperture axis 25 and the optical axis 20, a principal axis of cylinder is easily located. Thus, even though rotation is never required to locate a principal axis, if rotation of the suspect optics does occur, a principal axis is easily located.

Remembering this much, attention can now be devoted to the use of the disclosed lens meter to measure conventional lenses in sphere, cylinder and axis. This can be described with reference to FIGS. 3a–3d, 4a–4d and 5a–5d. A second case of measurement will be set forth with reference to FIGS. 3a–3d, 4a–4d, and 6a–6d.

Referring to FIG. 3d, a combination sphere and cylinder lens is illustrated such as those that might be found in a standard optical prescription for eyeglasses. Specifically, lens S in FIG. 3d described in a positive convention is the equivalent to 0.3 diopters of sphere and 1.4 diopters of positive cylinder at an axis of 67.5°. Described in a negative convention, this is the same as 1.7 diopters of sphere and −1.4 diopters of negative cylinder at an axis of 157.5°.

In each of the FIGS. 3, the small arrows are indicative of the angular deflection expected for a ray passing through the lens at various positions on an annular ring of lens surface.

This lens can be built of component lenses having one spherical component and two optical cross cylinder components, each aligned 45° one to another. FIG. 3a is a spherical lens, which is the spherical component. The equivalent spherical component will be one positive diopter. Lens 3b is the first cross cylinder component with negative half a diopter of cylinder at axis 45°. Lens 3c is the second cylindrical component and is positive half a diopter of cylinder at 90° and negative half a diopter of cylinder at 0°. Lens 3a, 3b and 3c will optically combine to be the equivalent of lens 3d. These lenses will be the same no matter whether the so-called "positive" convention is used or the so-called "negative" convention is used. Vectors schematic of the separate and combined lens deflections are illustrated in FIGS. 3a–3d.

Having set forth an example of possible suspect lens in sphere, cylinder and axis, the angular deflection at the entrant aperture A and exit aperture X can be discussed. This discussion will first occur with reference to the 0° alignment or horizontal alignment shown in FIGS. 4a–4d.

Consider the case of the deflection produced by lens 3a. By causing entrant aperture A and exit aperture X to overlie the one diopter positive spherical lens, it will be remembered that optical deviation towards the center of the spherical lens occurred. Specifically in the case of entrant aperture A, a one diopter central deflection will result. This is shown by vector 71.

When the light exits aperture X, this deflection will be doubled. Specifically, the deflection will be caused along vector 72 and 73, both of which are equal to the initial deflection of vector 71. Referring to FIG. 4d, it can be seen that the resultant component of optical beam deflection along the entrant-exit aperture axis 25 will include vectors 71 for entrant aperture A and vector 72, 73 for exit aperture X. This total aligned deflection can be identified by the letter $\alpha$.

It is important at this juncture that a sign convention (plus or minus) be adopted and adhered to to describe deflections. Thus, aligned deflections $\alpha$ will be considered positive when upon departing exit aperture X they are deflected towards aperture A; aligned deflections $\alpha$ will be considered negative when upon departing exit aperture X they are deflected away from aperture A.

Referring to FIG. 3b and remembering the case illustrated with respect to FIG. 2, optical deflection of the ray normal to entrant-exit axis 25 can be set forth. Specifically, there will be a small deflection of vector 74 away from the entrant-exit aperture axis 25. When the light is retrodirected through exit aperture X this vector will be doubled as at vectors 75, 76. These vectors will enter into the summation illustrated at FIG. 4d. This total transverse deflection can be identified by the letter $\beta$.

As in the case of the deflection $\alpha$, for the deflection $\beta$ it is important that a sign convention (plus or minus) be adopted and adhered to to describe deflections. Thus, normal deflections $\beta$ will be considered positive when departing exit aperture X they are deflected clockwise from entrant aperture A; normal deflections $\beta$ will be considered negative when departing exit aperture X they are deflected counterclockwise from entrant aperture A.

Finally, and with reference to FIG. 3c, the positive half diopter at 90° will superimpose itself onto the spherical prescription measured at FIG. 4a. Specifically, entrant aperture A will have a positive cylindrical component 77. This positive cylindrical component will be doubled at exit aperture X by schematically represented vectors 78, 79, these deflections again being shown by the angle $\alpha$.

Referring to FIG. 4d, the summation of the total plot equivalent to the tandem deflections of lenses 3a–3c or to the equivalent combined lens 3d is shown. Specifically, the angularity of light emanating from exit aperture X is vectorially resolved into two components. First, there is the component of the vectors 75, 76 (or $\beta$), which is normal to the entrant-exit aperture axis 25. As will readily be seen with reference to FIG. 3b, this is nothing more nor less than the optical cross cylinder represented in FIG. 3b. Thus, one of the results of the vectorial summation of FIG. 4d is that a $-\frac{1}{2}$ cylinder at 135° and a $+\frac{1}{2}$ cylinder at 45° is a readout of deflection normal to the plane of the retroreflector axis 25 and entrant aperture A.

It should be noted that this reading is independent of sphere. It should also be noted that this reading is independent of cross cylinder which is parallel to or normal to the entrant-exit aperture axis 25, for which the vectorial contribution is shown in FIG. 4c.

Thus, the first reading gives a readout, which readout in a deviation normal to the entrant-exit aperture axis is proportional to the cross cylinder diagonally taken to the entrant-exit aperture axis 25.

The deflection along the entrant-exit aperture axis 25 is not so simple. Specifically, it will include components of sphere, on one hand, and aligned and normal cross cylinder on the other hand (see FIGS. 4a and 4c), which components are indistinguishable from each other. These are shown by the combined angle $\alpha$ in FIG. 4d.

To render the combined deflection $\alpha$ meaningful, it is necessary to take a second reading with the entrant-exit aperture axis 25 at a new angle with respect to the suspect optics to reach the complete test result in desired sphere and cross cylinders or sphere, cylinder, and axis.

In this application, three examples for determining full prescription will be given. First, a second reading of the entrant-exit aperture axis at an angle 45° to the originally chosen entrant-exit aperture axis will be analyzed. This analysis will occur with respect to FIGS. 5a–5b.

Secondly, an alternate second reading having the entrant-exit aperture axis at a 90° angle relative to the original chosen axis will be utilized. This analysis will occur with reference to FIGS. 6a–6b.

Finally, an algebraic analysis will be presented covering all cases where there is an appreciable angular deviation between the first chosen entrant-exit aperture axis and a second chosen entrant-exit aperture axis.

Referring to FIG. 5a, it will be seen that the entrant-exit aperture axis has been changed. Specifically, a new beam of light B is entrant at aperture A and exits with a new angular deflection at aperture X. This new entrant-exit aperture axis is at 45° relative to the entrant-exit aperture axis shown in FIGS. 4a–4d. Beam B undergoes a deflection represented by 81 on entering through aperture A to the spherical suspect lens shown in FIG. 3a. Beam B exiting exit aperture X is deflected angularly as indicated by vectors 82, 83. It will be observed that these are the same length as vector 72, 73 of FIG. 4a.

FIG. 5b, however, will not be analogous when considering the lens of FIG. 3b and the vectorial schematic of FIG. 4b. Specifically, the positive cylinder effect overlying aperture A will cause vectorial displacement in the direction of vector 84. When beam B departs exit aperture X, this vector will be doubled to lie in or on the entrant-exit aperture axis 25. This is shown by vectors 85, 86.

Finally considering the case of FIG. 5c, it will be seen that deflection through entrant aperture A will result in a vector of deflection 87. This vector will be doubled upon beam B departure from exit aperture X as represented by vectors 88, 89.

Referring to FIG. 5d, it will be seen that the vectors can be plotted. Specifically, beam B in departing exit aperture X will go to a new location at the tip of vector 86 displaced from axis X. This deflection will include an aligned deflection $\alpha$ and a transverse deflection $\beta$.

Referring to FIG. 5c, it will be seen that the vectorial deflection there illustrated applies to cross cylinder. Specifically, the cross cylinder there identified will be the positive half a diopter of cylinder at 0° and the minus half a diopter cylinder at 90°.

It will be further seen that both sphere and cylinder deflections within the plane or normal to the plane of entrant-exit aperture axis 25 will not appear. The solution for the two components of astigmatism in their cross cylinder representation is present. Specifically, the vectorial addition of FIG. 4b and the vectorial addition of FIG. 5c identifies the cross cylinder components of FIGS. 3b and 3c respectively. Since FIG. 5c is merely the deflection of the resultant beam B normal to the entrant-exit axis 25, it is easily measured and determined.

In the examples of FIGS. 4a–4d and 5a–5d, sphere is determined by one of two separate formulas.

First, it will be noted that the deflection in FIG. 4d parallel to the entrant-exit aperture axis 25 is a sum. It is a sum of the unknown spherical output of element 4a and of the unknown cross cylinder output of FIG. 4c. Thus, it may be said that it equals:

$$\alpha_4 = S + A_{0°-90°}$$

where:
$\alpha_4$ is the aligned deflection of beam B leaving exit aperture X in FIG. 4d;
S is unknown sphere; and,
$A_{0°-90°}$ is unknown astigmatic correction of 0°–90° orientation (cross cylinder of +, $-A_{0°-90°}$ strength).

With regard to sign (plus or minus), aligned deflection is considered positive (+) when upon leaving X they are directed toward A. Transverse deflections are considered positive (+) when upon leaving X they are directed clockwise (at a 90° angle) about A.

Referring to FIG. 5c, it can be seen that the 0°–90° astigmatism is known. Specifically, the 0°–90° astigmatism is the transverse deflection $\beta_5$ of FIG. 5d.

Therefore by taking the aligned deflection of the beam B to entrant-exit aperture axis 25 and subtracting the transverse deflection of FIG. 5d, the result is the spherical unknown of FIG. 3a.

This can be mathematically expressed:

$$\alpha_4 = S + \beta_5$$

$$\text{or } S = \alpha_4 - \beta_5$$

This same result can be obtained by a second but different formula, which redundant but different formulas apply a convenient check. It can be seen in FIG. 5d the deflection along the entrant-exit aperture axis 25 includes two inputs. The first is in the unknown input of sphere, the second in the unknown input of the 45°–135° cross cylinder. This can be mathematically expressed:

$$\alpha_5 = S + A_{45°-135°}$$

where:
$\alpha_5$ is the aligned deflection of beam B leaving exit aperture X in FIG. 5d;
S is unknown sphere; and,
$A_{45°-135°}$ is astigmatism correction in 45°–135° cross cylinder.

Referring to FIG. 4b, however, the 45°–135° astigmatism is known. In this case $A_{45°-135°}$ is $-\beta_4$. By subtracting from the deflection of FIG. 5d parallel to the entrant-exit aperture transverse deflection of FIG. 4d sphere again results. This may be mathematically expressed:

$$\alpha_5 = S - \beta_4$$

or $S = \alpha_5 + \beta_4$

It will be noted that this last algebraic solution for sphere is redundant. Two different equations for the unknown sphere have been determined.

These equations amount to a check. If they do not equate to each other within acceptable tolerances, they indicate the presence of error. This presence of error not only relates to the possibility that the spherical component is wrong, but additionally to the possibility that astigmatic components may as well be wrong. That is to say, an error can be present in determining 0°–90° astigmatism or 45°–135° astigmatism.

For simplicity, the deflection dependence on the separation of entrant and exit apertures has not been shown and a unity relation between deflection and power has been assumed. However, to one knowledgeable in the properties of lenses, it will be apparent that the deflection increases substantially linearly with the radial distance from the center of the lens, hence also linearly with the distance between the sampling apertures.

It should further be appreciated that the retroreflecting mechanism here shown has the effect of neutralizing prism. Thus, even though a lens containing cylinder and sphere is displaced up and down or to one side of the entrant aperture A, or exit aperture X, the solution generated should be the same. The principal difference will be a redistribution of the components of deflection, but not the total deflection. Thus, a convenient scan for the uniformity of the lens is provided. By the simple expedient of translating the lens around relative to the apertures without a change of exit angle, a uniform readout should be generated.

Having set forth the solution for the cross cylinders and sphere with respect to FIGS. 4a–4d and 5a–5d, the alternate solution for sphere and cylinder with respect to FIGS. 4a–4d and 6a–6d can now be discussed.

Referring to FIG. 6a, it will be seen that the entrant-exit aperture axis has been changed. A new beam of light B is entrant at aperture A and exits with a new angular deflection at aperture X. This new entrant-exit aperture axis is at 90° relative to the entrant-exit aperture axis shown in FIGS. 4a–4d.

Beam B undergoes a vector of displacement 91 in entrance to aperture A in the spherical suspect lens shown in FIG. 3a. Beam B exiting exit aperture X is deflected angularly as indicated by vectors 92, 93. It will be observed that these are the same lengths as vectors 72, 73 of FIG. 4a.

Considering the case of FIG. 6b, it will be seen that the deflection through entrant aperture A will result in a vector of deflection 94. Upon exiting exit aperture X a vectorial deflection 95, 96 will result all of which is transverse to the entrant-exit aperture axis 25.

Stopping at this point, it will be noted that the transverse deflection shown in FIG. 6b is the same as the transverse deflection shown in FIG. 4b. Moreover, this will be a second measure of 45°–135° astigmatic component of the suspect lens. All sphere and all 0°–90° astigmatism will be eliminated.

Finally, considering the case of FIG. 6c it will be seen that the cylinder contributes to the deflection along the entrant-exit aperture axis 25. The negative cylinder overlying aperture A will cause vector deflection indicated by vector 97. When beam B departs exit aperture X, this vector will be doubled and lie along the entrant-exit aperture axis 25. This is shown by vectors 98, 99.

Analyzing the case here presented, it will be seen that only one astigmatic component is solved for and obtained in crossed cylinder form. The 45°–135° component is measured twice. The other components of sphere and cylinder are mixed together in displacements along the entrant-exit aperture axis 25.

Moreover, analyzing FIG. 6d in the case here given, it will be seen that vectors 91, 92, 93 in FIG. 6a are partially cancelled by vectors 97, 98 and 99 of FIG. 6c. Thus, a resultant total deflection indicated by vectors 100, 101 and 102 in FIG. 6d results for an aligned angular deflection $\alpha_6$. The transverse displacement of vectors 94, 95 and 96 remains unchanged for a transverse angular deflection $\beta_6$.

Taking:

$\alpha_4$ is aligned deflection of FIG. 4d
$\beta_4$ is transverse deflection of FIG. 4d
$\alpha_6$ is aligned deflection of FIG. 6d
$\beta_6$ is transverse deflection of FIG. 6d Then: $A_{45°-135°}$ is either $-\beta_4$ or $\beta_6$, and the average is preferred (i.e., $A_{45°-135°} = \beta_6 - \beta_4/2$)

Analyzing the aligned component of FIG. 4d ($\alpha_4$), this can be shown to be equal to:

$$\alpha_4 = S + A_{0°-90°}$$

where:

S is unknown sphere; and,
$A_{0°-90°}$ is unknown 0°–90° astigmatism.

Likewise, the aligned deflection of FIG. 6 can be expressed:

$$\alpha_6 = S - A_{0°-90°}$$

By adding the two equations it can be immediately seen:

$$\alpha_4 + \alpha_6 = 2S + (A_{0°-90°}) - (A_{0°-90°})$$

$$\text{or } S = (\alpha_4 + \alpha_6)/2$$

Thus the formulas for sphere are present.

Moreover, by subtracting the two equations 0°–90° equation may be obtained:

$$\alpha_4 - \alpha_6 = S - S + 2A_{0°-90°}$$

or $$A_{0°-90°} = (\alpha_4 - \alpha_6)/2$$

It will be noted that this case also has a redundance of solution. Specifically, there are two solutions for 45°–135° astigmatic components which serve as a check. There is one solution for sphere. There is another solution for 0°–90° astigmatism.

It will be seen using the above equations that a solution for a lens in terms of sphere, cylinder and axis can thus be obtained with two different alignments of the exit aperture axis 25. Specifically, the alignments could be at 45° or at 90°.

In actual fact it can be shown that there are general formulae. Providing for a rotation of the sampling axis greater than 10° or more, a useful result can be obtained. It should be realized that where you are dealing with "perfect" lenses and ignoring diffraction effects, rotations of even less than 10° would work. Perfect lenses would be lenses having absolutely uniform sphere and cylinder deviations in precise registry to given symmetric lens formulas.

Referring to FIG. 7, entrant apertures $A_1$ and $A_2$ are shown having respective and corresponding paired exit apertures $X_1$ and $X_2$. In the case of aperture $X_1$, transverse deflection $\beta_1$ and aligned deflection $\alpha_1$ is shown.

In the case of exit aperture $X_2$, aligned deflection lies $\alpha_2$ and transverse deflection $\beta_2$ is shown. As can be seen, the two exit aperture axes are rotated by an angle $\theta$ from one to another. They determine what the spherical power S, the cylindrical power C, and the axis $\phi$ are.

Referring to the diagram of FIG. 7, it can be seen:

$$\alpha_1 = d([S+C/2] - C/2 \cos 2\phi)$$

$$\beta_1 = -d\, C/2 \sin 2\phi$$

$$\alpha_2 = d([S+C/2] - C/2 \cos[2\phi-2\theta])$$

$$\beta_2 = -d\, C/2 (\sin[2\phi-2\theta])$$

where $\phi$ and $\theta$ are measured in radians. $\alpha_2$ and $\beta_2$ can be written:

$$\alpha_2 = d(S+C/2) - d(C/2)(\cos 2\phi \cos 2\theta + \sin 2\phi \sin 2\theta)$$

$$\beta_2 = -d\, C/2\, (\sin 2\phi \cos 2\theta - \sin 2\theta \cos 2\phi)$$

From these equations the following general expressions can be developed:

$$(S+C/2) = 1/d \left( \frac{\alpha_2 - \cos 2\theta\, \alpha_1 - \beta_1 \sin 2\theta}{1 - \cos 2\theta} \right)$$

$$C/2 \sin 2\phi = -\beta_1/d$$

$$C/2 \cos 2\phi = -1/d \left( \frac{\alpha_1 - \alpha_2 + \beta_1 \sin 2\theta}{1 - \cos 2\theta} \right)$$

From these general expressions the generic solutions can be developed as follows:

$$C = 2 \sqrt{(C/2 \cos 2\phi)^2 + (C/2 \sin 2\phi)^2}$$

$$\phi = \tfrac{1}{2} \arctan\left( \frac{C/2 \sin 2\phi}{C/2 \cos 2\phi} \right)$$

$$S = (S + C/2) - C/2$$

$C/2 \sin 2\phi$ can be identified with what was previously denoted $A_{45°-135°}$; and, $-C/2 \cos 2\phi$ can be identified with what was previously denoted $A_{0°-90°}$.

It can be seen in the aforementioned equations that $\beta_2$ was never used. Thus $\beta_2$ can be considered a redundant piece of information which can provide a check to the sphere, cylinder and axis values obtained.

Referring to FIG. 8a, a mask 27 with conventional retroreflector R consisting of lens L and mirror M is illustrated. Suspect optics are here shown in the form of a prism 110. Specialized entrant aperture $A_1$ and exit aperture $X_1$ are illustrated being positioned along and at respective conjugate locations of a central mask axis 25. The retroreflector mechanism is in all aspects identical to that previously illustrated with respect to FIG. 1.

Analyzing the entrant and exit path of a beam B, it will be seen that downwardly diverted angularity results from the presence of the prism 110. Upon rebounding of the light from the reflector along the path 114, this angularity is in effect cancelled in the exit of the beam B' from the optics of the lens meter.

Thus, it is plainly seen that the lens meter as to retroreflected light is insensitive to introduce prism. Taking the case of either a spherical or cylindrical lens, it is not necessary that the suspect lens center (in the case of a spherical lens) or lens axis (in the case of a cylinder lens) be registered to any axis of the system. Measurement of resultant cylinder and/or sphere will always be the same.

Additionally, and with respect to FIG. 8a, a conventional light source 120 is illustrated emanating its light beam B through an aperture 121 in the mirror or through a partially "silvered" region. Upon the emanation of this beam through the axis of lens L, it impinges upon the prism where it is provided with a downward angularity $B_1$ upon exit.

In this latter case it can be seen that registration of the suspect optics S to the axis of the system is important. For example, translation of a spherical lens such as that shown in FIG. 1 will introduce prism. Translation of a cylindrical lens likewise will result in prism measurement. Thus, where eyeglasses are placed within the lens meter at the point of optimum interpupillary separation, prism measurements will be detected by the angular deviation of the light beam $B_1$.

It should be realized that a lens meter can be made, which by measuring the angularity of these discrete light beams, can simultaneously measure sphere, cylinder and prism for any given lens system. This should be readily apparent from an analysis of FIGS. 1, 2 and 8a.

Referring to FIG. 8b, the problem of prism parallax is easily explained and understood. Remembering that FIG. 8b is an illustration of a side elevation of the mask and suspect optics S of FIG. 8a, it will be seen that the conjugate image of entrant aperture $A_1$ will not precisely register with exit aperture $X_1$. Tracing a principal ray $B_2$ through prismatic suspect optics S, it will be seen that the image of aperture $A_1$ will fall below the central portion of exit aperture $X_1$. This is illustrated by the ray $B_2'$ at the bottom of FIG. 8b.

Likewise, a conjugate image of exit aperture $X_1$ will not register at entrant aperture $A_1$. Instead, an image of aperture $X_1$ will be registered slightly below entrant aperture $A_1$ as illustrated by rays $B_3$ and $B_3'$.

In order to minimize this parallax effect, a specialized aperture can be used. Accordingly, there is illustrated in FIG. 8c a configuration of such a specialized aperture, the aperture here being shown to be aperture $X_1$ (it being realized that aperture $A_1$ is precisely identical).

At aperture $X_1$, the image of aperture $A_1$ is illustrated in broken lines 125 superimposed to the aperture or stop provided by aperture $X_1$, the precise outline of the aperture being shown by solid lines 124. Broadly, the stop consists of an aperture in the shape of a solid bar 127 having an overlying square 129. As can be seen, square 129 is positioned centrally of the bar and on the opposite side of the axis 25.

Remembering that the retroreflecting optics will invert the image, it will be seen that the image of the entrant aperture $A_1$ will have its bar 127' registered slightly below exit aperture $X_1$. The resultant light passing through the specialized aperture of this invention will include the shaded area 130.

It has been found that by arranging a uniform intensity of light passing through the aperture at all portions of the image 130, the parallax effect of introduced prism within the lens meter of this invention can be effectively neutralized.

Alternately, the size of the parallax effect can be estimated based on the measured prism, and the effect can be corrected computationally.

Placement of the suspect optics in the lens meter is important.

Referring to FIG. 9, the placement of suspect optics on either side of a mask 27 is illustrated. Suspect optics $S_1$ are shown in a position juxtaposed to mask 27. In this position, a back vertex measurement (common to eyeglasses) can be taken from a point on the lens 135 to the image plane. Sphere and cylinder are read on a back vertex basis.

As distinguished from a vertex measurement, it is sometimes important to have "power" of a lens determined. This is especially useful in photographic optics and the like. According to this aspect of the invention, the suspect optics are placed at a position $S_2$. In this location the suspect optics $S_2$ are placed so that the mask 27 is between the retroreflecting optics and retroreflector.

It should be noted that in the case of optics $S_2$, precise juxtaposition of the suspect lens $S_2$ to the mask is not required. The optics of this invention are relatively insensitive to towards and away placement of the suspect optics $S_2$ from mask 27 so long as measuring rays of the lens meter pass through active portions of the suspect optics.

Referring to FIG. 10, it will be appreciated that various retroreflecting combinations can be used with this invention. It should be further appreciated that the optics of retroreflector R of the type shown in FIG. 1 are preferred.

FIG. 10 illustrates another useful retroreflector. Broadly, a spherical mirror $M_2$ is placed so that the conjugate images of entrant aperture A and exit aperture X register to each other. By the introduction of a beam $B_5$ to the central axis 140 of the spherical mirror, two effects will be observed. First, a conjugate image of entrant aperture A coincides with exit aperture X. Second, the angularity of the ingoing light ray $B_5$ is known relative to the outgoing ray $B_5'$.

With such a retroreflector, it can be seen that the beams of light inevitably diverge as they approach the spherical retroreflector $M_2$. This being the case, when a lens is translated towards and away from a spherical retroreflector, the sampling base leg will change. For example, when the lens is adjacent the mirror $M_2$, the base leg will be small. When the lens is away from the spherical reflector $M_2$, the sampling base leg will be large.

These placement effects have a lessened effect as the radius of the mirror increases. Generally, estimates of the effect of the changing base leg may be employed to compensate the effect in a particular device.

Referring to FIG. 11, a typical apparatus is illustrated for measuring the departing angularity of a light ray B. A detector 150 is illustrated. Typically, this detector consists of a block of photosensitive semiconductors having photocurrent shared to collecting electrodes depending on proximity of the light spot to each electrode. These respective connections indicate at their output on an essential Cartesian coordinate basis the angularity of the exiting ray B from exit aperture X on mask 27. This angularity can be determined once the distance between the detector 150 and mask 27 is known. It has been found that such detectors can become sensitive to overall light intensity changes, secondary reflections, lens shadings and the like. Accordingly, the apparatus illustrated in FIG. 12 is preferred. It will be appreciated that there are many apparatus well-known in the art capable of measuring such an angle.

I have, during the course of the explanation of my invention, carefully made a preferred example using two sampling base legs across the suspect optics. Those having skill in the art will understand that the second base leg could be generated by measuring the suspect lens or optics, rotating the optics, and again measuring, these measurements using the same entrant and exit apertures.

It should be further understood that this invention is not restricted to the particular equation forms shown here. There are many forms of answers. The form illustrated here is not unique in that the possible mathematical expressions which could be generated are multitudinous.

It should be further understood that the particular form here shown is exemplary. It does not necessarily represent the optimum conditions for all sampling angles $\theta$.

I claim:

1. A lens meter for measuring a suspect lens comprising: at least one light source having means for emanating a substantially collimated beam of light; a retroreflecting means having optical axis, said retroreflecting means including an entrant aperture aligned to receive light from said light source and displaced from the optical axis of said retroreflector to image a real image of said entrant aperture to an exit aperture at a conjugate location of said retroreflector in a plane including the axis of said retroreflector and said entrant aperture; said retroreflector means further including means for reflecting light exiting said retroreflector at a known angularity with respect to the angularity of light entrant the retroreflector through said entrant aperture; means for placing a suspect lens proximate to said entrant aperture and said imaged exit aperture and means for measuring the changed angular deviation of light exiting said image of said entrant aperture due to the deflection of said suspect lens to determine a first power of said suspect lens.

2. The invention of claim 1 and wherein said retroreflecting means comprises: a reflecting surface; a positive spherical lens, said positive spherical lens being separated by the focal length of said lens from said reflective surface.

3. The invention of claim 1 and wherein said retroreflecting means comprises: a substantially spherical reflecting mirror, said substantially spherical reflecting mirror being separated from the entrant and exit apertures by the radius of said mirror and being aligned between said entrant and exit aperture to image the image of said entrant aperture to said exit apertures.

4. The invention of claim 1 and wherein said means for measuring the changed angular deviation of light exiting said exit aperture includes a plane spaced at a known distance from said exit aperture and means for detecting the excursion of said beam at said plane.

5. The invention of claim 1 and including a second substantially collimated beam of light, said second light beam exiting from said retroreflecting mechanism through said suspect optics; and, means for measuring the changed angular deviation of said second light beam due to the deflection of said suspect lens to determine the power of said suspect lens in prism.

6. A process for measuring a suspect lens comprising: providing means for emanating a substantially collimated beam of light; providing a retroreflecting mechanism having an optical axis; providing an entrant aperture to said retroreflecting mechanism aligned to receive light from said light source and displaced from the optical axis of said retroreflector, said provided retroreflector having means to image a real image of said entrant aperture to an exit aperture at a conjugate location of said retroreflector across a plane including the axis of said retroreflector and said entrant aperture; said provided retroreflector further including means for reflecting light exiting said retroreflector at a known and proportional angularity with respect to the angularity of light entrant the retroreflector through said entrant aperture; placing a suspect lens proximate to said entrant aperture and said exit aperture; and measuring the changed angular deviation of light exiting said exit aperture due to the deflection of suspect lens to determine the power of said suspect lens.

7. The process of claim 6 and wherein said step of providing a retroreflector includes providing a reflecting surface; providing a positive spherical lens, and placing said positive spherical lens between the suspect optics and said reflective surface with a spatial interval between said reflective surface and said positive spherical lens equal to the focal length of said lens.

8. The process of claim 6 and wherein said provided retroreflector includes the step of providing a substantially spherical reflecting mirror; placing said substantially spherical reflecting mirror at a position to cause said entrant and exit apertures to be at conjugate locations so that the real image of said entrant aperture overlies said exit aperture.

9. The invention of claim 6 and wherein said step of measuring the changed angular deviation of light exiting said image of said exit aperture comprises the steps of: placing a plane at a known distance from said exit aperture; and, measuring the excursion of said beam on said plane to determine the angular deviation of said beam due to said suspect optics.

10. The process of claim 6 and including the step of providing means for emanating a second substantially collimated beam of light from said retroreflector towards said suspect optics, passing said second substantially collimated beam of light through said suspect optics; and, measuring the changed angular deviation of said light from said second light source due to the deflection of said suspect lens to determine the prismatic power of said suspect lens.

11. A lens meter for measuring a suspect optics in sphere, cylinder, and cylinder axis comprising: means for emanating first and second substantially collimated beams of light; a retroreflecting means having an optical axis, said retroreflecting means including a first entrant aperture for passing said first beam of light and a second entrant aperture for passing said second beam of light, both said entrant apertures removed from the optical axis of said retroreflector; said retroreflector including means for imaging said entrant apertures to image a real image of said entrant apertures to respective first and second exit apertures at conjugate locations of said retroreflector; said retroreflector means further including means for reflecting light exiting said retroreflector at a known angularity with respect to the angularity of light entrant the retroreflector through said first and second entrant apertures; said first and second entrant apertures separated by an interval in the range of 10° to 170° about the optical axis of said retroreflector; means for placing a suspect lens proximate to said first and second entrant apertures and said first and second imaged exit apertures; and, means for measuring the changed angular deviation of light exiting said image of said exit apertures due to the deflection of said suspect lens to determine power of said suspect lens in sphere, cylinder and cylinder axis.

12. The invention of claim 11 and wherein said angular interval defined by the axis of said retroreflector and said first and second entrant apertures is 45°.

13. The invention of claim 11 and wherein said angular interval defined by the axis of said retroreflector and said first and second entrant apertures is 90°.

14. The invention of claim 11 and wherein said retroreflecting means comprises: a reflecting surface; a positive spherical lens, said positive spherical lens being separated by the focal length of said lens from said reflective surface, and said positive spherical lens being placed between said suspect optics and said reflective surface.

15. The invention of claim 11 and wherein said retroreflecting means comprises: a substantially spherical reflecting mirror, said substantially spherical reflecting mirror being separated from the entrant and exit apertures by the radius of said mirror and being aligned with an optical axis between said first and second respective entrant apertures on one hand, and said first and second respective exit apertures on the other hand to image each said entrant aperture into substantial coincidence with each said exit aperture.

16. The invention of claim 11 and wherein said means for measuring the changed angular deviation of light exiting said exit apertures includes a plane spaced at a known distance from the exit aperture; and, means for detecting the excursion of said beam at said plane.

17. The invention of claim 11 and including means for emanating a beam of substantially collimated light emanating from the direction of said retroreflecting mechanism and aligned for passing through said suspect optics to determine prismatic power of said suspect lens.

18. A process for measuring suspect optics in sphere, cylinder, and cylinder axis comprising: emanating at least first and second substantially collimated beams of light; providing a retroreflecting mechanism having an optical axis, said retroreflecting mechanism including a first entrant aperture for passing said first beam of light, and a second entrant aperture for passing said second beam of light, both said entrant apertures removed from the optical axis of said retroreflectors; said retroreflector including means to image a real image of said entrant apertures to respective first and second exit apertures at conjugate locations of said retroreflector, said retroreflector further including means to emanate light from said exit apertures of said retroreflector at known angularity to light emanated to said entrant apertures; separating said respective entrant apertures by an angular interval about the optical axis of said retroreflector in the range of 10° to 170°; placing a suspect lens proximate to said first and second entrant apertures and said first and second imaged exit apertures; and, measuring the changed angular deviation of light exiting said image of said exit apertures due to the deflection of said suspect lens to determine the power of said suspect lens in sphere, cylinder, and cylinder axis.

19. The process of claim 18 and including the step of separating said respective first and second entrant apertures by an angular interval of 45° about the axis of said retroreflector; measuring the changed angular deflection normal to a first plane including the optical axis of said retroreflector and said first entrant aperture to determine cylindrical power in cross cylinder along first and second axes, each at 45° to said first plane; measuring the angular deflection normal to a second plane including the optical axis of said retroreflector and said second entrant aperture to determine optical cross cylinder at 45° angular intervals from said second plane; and, algebraically taking the aligned deflection in one of said planes and summing the transverse deflection of the other of said planes to determine sphere.

20. The process of claim 18 and including the steps of separating said respective first and second entrant apertures by an angular interval of 90° about the axis of said retroreflector; measuring the changed deflection normal to a first plane including the optical axis of said retroreflector and either one of said entrant apertures to determine the cylindrical power of said lens in cross cylinder along axes at 45° to said plane; measuring one half the sum of the aligned deflection of said light beams in planes including the optical axis of said retroreflector and both of said entrant apertures to determine the spherical power; and, taking the difference of the aligned deflection of planes including the optical axis of said retroreflector and both of said entrant apertures to determine cylindrical power of cross cylinder in the axis of said plane.

21. The process of claim 18 including the step of emanating a third beam of substantially collimated light from said retroreflector through said suspect optics; measuring the deflection of said third beam of light through said suspect optics to determine prism power of said suspect optics.

22. A lens meter for measuring a suspect lens system comprising: means for emanating a substantially collimated beam of light; a retroreflecting means having an optical axis, said retroreflecting means including an entrant aperture aligned to receive said substantially collimated beam of light displaced from the optical axis of said retroreflector, said retroreflector including means to image a real image of said entrant aperture to an exit aperture at a conjugate location of said retroreflector in a plane including the axis of said retroreflector and said entrant aperture; providing said entrant aperture with a first elongate portion parallel to and on one side of said plane from the central portion of said entrant aperture; a second and smaller entrant portion on the opposite side of said plane extending from said entrant aperture on the opposite side of said plane; and, providing an optical stop at said exit aperture, said optical stop at said exit aperture including a first and complementary elongate portion parallel to and on said one side of said plane extending from the central portion of said exit aperture; said optical stop further including a second and smaller exit portion on said opposite side of said plane extending from said exit aperture on the opposite side of said plane whereby prism in said suspect optics produces an average coincident aperture at said exit aperture.

23. A process for determining the principal axis in cylinder of a suspect optical system comprising: providing a substantially collimated beam of light; providing a retroreflecting mechanism having an optical axis; providing an entrant aperture to said retroreflecting mechanism aligned to receive said substantially collimated beam of light and displaced from the optical axis of said retroreflector, said provided retroreflector having means to image a real image of said entrant aperture to an exit aperture at a conjugate location of said retroreflector across a plane including the axis of said retroreflector and said entrant aperture; said provided retroreflector further including means for reflecting light exiting said retroreflector at a known and proportional angularity with respect to the angularity of light entrant the retroreflector through said entrant aperture; placing a suspect lens proximate to said entrant aperture and said exit aperture; and, rotating said suspect optics until changed angular deviation of said light exiting said image of said exit aperture occurs within a plane including said entrant aperture and the optical axis of said retroreflector whereby principal axes in cross cylinder of said retroreflecting mechanism are in said plane along said optical axis and at 90° to said plane along said optical axis.

* * * * *